US012787923B2

(12) United States Patent
Bachman et al.

(10) Patent No.: US 12,787,923 B2
(45) Date of Patent: Nov. 10, 2026

(54) BRAKING OF A MOTOR DURING A BATTERY DISCONNECT

(71) Applicant: CURTIS INSTRUMENTS, INC., Mount Kisco, NY (US)

(72) Inventors: Michael S. Bachman, Mount Kisco, NY (US); Roger White, Mount Kisco, NY (US)

(73) Assignee: Parker-Hannifin Corporation, Cleveland, OH (US)

( * ) Notice: Subject to any disclaimer, the term of this patent is extended or adjusted under 35 U.S.C. 154(b) by 309 days.

(21) Appl. No.: 18/431,307

(22) Filed: Feb. 2, 2024

(65) Prior Publication Data

US 2024/0268265 A1 Aug. 15, 2024

Related U.S. Application Data

(60) Provisional application No. 63/444,493, filed on Feb. 9, 2023.

(51) Int. Cl.

| | |
|---|---|
| ***A01D 34/00*** | (2006.01) |
| ***A01D 34/78*** | (2006.01) |
| ***A01D 34/82*** | (2006.01) |
| ***H02J 7/34*** | (2006.01) |
| ***H02J 9/06*** | (2006.01) |
| ***H02P 3/18*** | (2006.01) |
| *A01D 101/00* | (2006.01) |

(52) U.S. Cl.

CPC ......... *A01D 34/828* (2013.01); *A01D 34/006* (2013.01); *A01D 34/78* (2013.01); *H02J 7/345* (2013.01); *H02J 9/062* (2013.01); *H02P 3/18* (2013.01); *A01D 2101/00* (2013.01)

(58) Field of Classification Search

CPC ...... A01D 34/828; A01D 34/06; A01D 34/78; H02J 7/345; H02J 9/062; H02P 3/18; H02P 3/22; H02P 3/12; H02H 3/24

See application file for complete search history.

(56) References Cited

U.S. PATENT DOCUMENTS

| | | | | |
|---|---|---|---|---|
| 10,637,372 B2 * | 4/2020 | Larsén | ...................... | H02P 3/12 |
| 2014/0253008 A1 * | 9/2014 | Sykes | ...................... | H02H 3/24 318/494 |
| 2020/0113133 A1 | 4/2020 | Zeiler et al. | | |
| 2022/0094297 A1 | 3/2022 | Lacaux et al. | | |
| 2022/0385213 A1 * | 12/2022 | Wang | ........................ | H02P 3/18 |
| 2025/0080015 A1 * | 3/2025 | Takeda | ..................... | G05B 9/02 |

FOREIGN PATENT DOCUMENTS

WO 2013015171 A1 1/2013

OTHER PUBLICATIONS

Extended European Search Report, European Patent Application 24156406.1, Jul. 15, 2024, 9 pp.

* cited by examiner

*Primary Examiner* — Robert E Pezzuto

(74) *Attorney, Agent, or Firm* — The Belles Group, P.C.

(57) ABSTRACT

In one embodiment, an apparatus for motor stoppage during a battery disconnect includes a safe torque off circuit, a backup power source, and a feedback input. The backup power source is configured to supply power to the safe torque off circuit. The feedback input is configured to provide a status signal to the safe torque off circuit. The safe torque off circuit is configured to provide a switch signal to a motor circuit in response to the status signal.

18 Claims, 9 Drawing Sheets

BRAKING OF A MOTOR DURING A BATTERY DISCONNECT

CROSS REFERENCE TO RELATED APPLICATIONS

The present application claims the benefit of U.S. Provisional Patent Application No. 63/444,493 filed on Feb. 9, 2023, which is incorporated herein by reference in its entirety.

BACKGROUND

A turn over event describes a situation where a vehicle or other device is tipped over. There are several safety concerns for a turn over event. These concerns may be exacerbated in electric vehicles when the electric motors continue to turn after the turn over event. In some instances, control systems may be included to control the electric motors to a stop. However, if the power source to the control system (e.g., the battery of the electric vehicle) has become disconnected during the turn over event, the control system may be unable to perform the controlled stop. The following embodiments describe apparatus and method for braking or otherwise slowing or stopping the electric motors even during a power source disconnection.

When providing the survey through a computer or mobile application, answers can be provided in real-time. What is needed is a system whereby a leader can receive the answer and respond to the employee in real-time while maintaining the anonymity of the employee.

BRIEF SUMMARY

The present disclosure may be directed, in one aspect, to an apparatus for motor stoppage during a battery disconnect, the apparatus including a safe torque off circuit; a backup power source configured to supply power to the safe torque off circuit; and a feedback input configured to provide a status signal to the safe torque off circuit; wherein the safe torque off circuit is configured to provide a switch signal to a motor circuit in response to the status signal.

In another aspect, a motor controller for a lawnmower is disclosed, the motor controller including a safe torque off circuit for motor stoppage during a battery disconnect; a backup power source configured to supply power to the safe torque off circuit; and a feedback input configured to provide feedback to the safe torque off circuit, the feedback including an indication of whether at least one blade of the lawnmower is rotating and an indication of normal operation of the motor controller; wherein the safe torque off circuit is configured to provide a switch signal to a motor circuit in response to the feedback.

In yet another aspect, a method for controlling a motor is disclosed, the method including receiving, at a safety circuit, a first feedback signal indicative of operation of a motor controller; receiving, at the safety circuit, a second feedback indicative of a rotation of a motor; and generating, at the safety circuit, a switch signal in response to the first feedback and the second feedback, wherein at least two phases of a driving circuit for the motor are connected in response to the switch signal.

BRIEF DESCRIPTION OF THE DRAWINGS

Exemplary embodiments are described herein with reference to the following drawings, according to an exemplary embodiment.

DETAILED DESCRIPTION

An electric vehicle includes one or more motors that operate on battery power or other electric only sources. The term electric vehicle may be distinct from an electric car or electric automobile and encompass a wide variety of applications. Examples include lawnmowers, tillers, trimmers, tractors, utility vehicles, mobile aerial lifts, forklifts, and others. These vehicles may include control systems to provide automated motion control and safety mechanisms. In some examples, rather than an electric vehicle, the following examples are implemented by an electric handheld device (e.g., trimmer, saw).

When the vehicle is an electric lawn mower, for example, a turn over (tip over) event may result in exposure of moving blades. In the battery electric powered riding lawn care industry, it is common and required that a cutting blade be stopped in the event of a vehicle turn over. This can be accomplished many ways. For example, the system assumes that power is available to the motor controller such that the cutting blade motor can be controlled to a stop. The situation becomes more complex when the turn over event also involves the loss of power, that is, when the battery becomes disconnected.

However, during a vehicle turn over event, it may be common that power will be lost to the motor controller(s) either by the system requesting a disconnect (opening a battery contactor) or by the power source become dislodged (such is in a gravity held removable battery pack) or disconnected by the force of the event itself.

Figure 1:
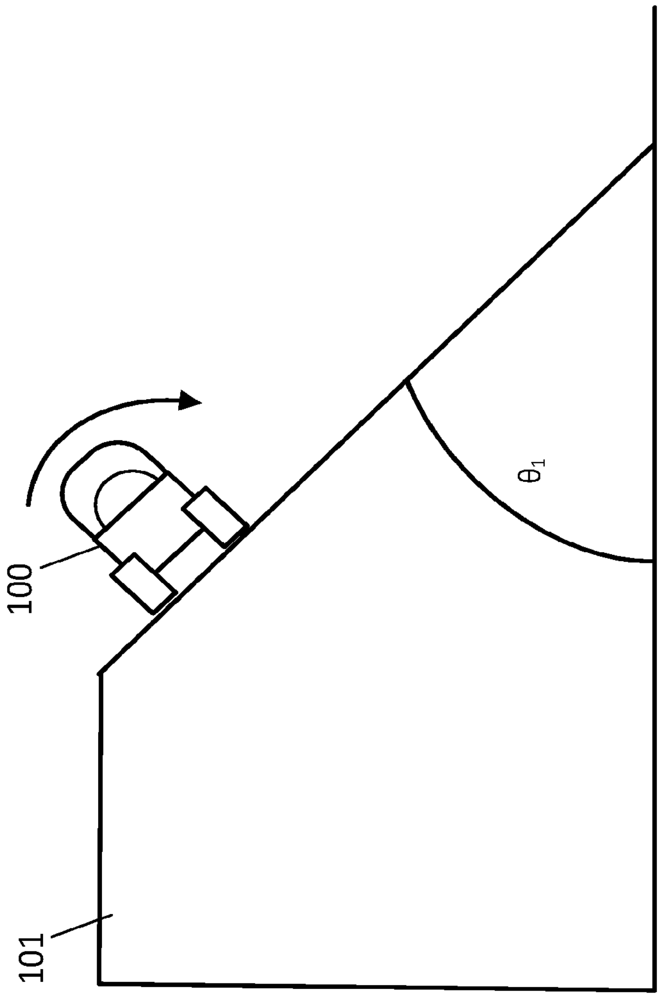
FIG. 1 illustrates an example electric vehicle on a ramp.

FIG. 1 is an example setting of a turn over event. FIG. 1 illustrates an example vehicle 100 to represent any of type of electric vehicle traveling on an example ramp 101 having an inclined plane at angle θ. The angle θ is measured from the horizontal plane (e.g., the surface of the earth or a line/plane perpendicular to the direction of gravity) such that higher positive numbers in degrees or radians indicate steeper angles for the ramp 101. Depending on the details of the vehicle 100, the path of travel, and the angle θ, situations may arise where there is a risk of a turn over event with a loss of power.

In some instances, a cutting blade continues to spin after the loss of power due to inertia or kinetic energy in the moving cutting blade. If the battery remained connected, the cutting blade motor may act as a generator, a source of power that flows to the battery, slowing the cutting blade motor. Thus, the cutting blade motor acts as a source of electrical power and the battery acts as a sink of the electrical power. But if the battery does not remain connected, there is no path for the generator source of power, and the cutting blade may spin for a longer period of time.

The following examples include apparatus that are configured to provide an auxiliary circuit to provide another sink for the source of electrical power. In some examples, the auxiliary circuit may short the phases of the cutting blade motor, causing the power source to flow through the power stage circuit connected to the cutting blade motor and then back into the cutting blade motor. More specifically, power may flow from one phase of the cutting blade motor, through the power stage circuit, and then into another phase of the cutting blade motor. The electrical power may be dissipated through the resistance of the path of the current, generating heat. The kinetic energy stored in the moving blade motor is removed by the current flow and converted into heat causing, the at least one motor and the blade to slow in response to the battery disconnect.

Figure 2:
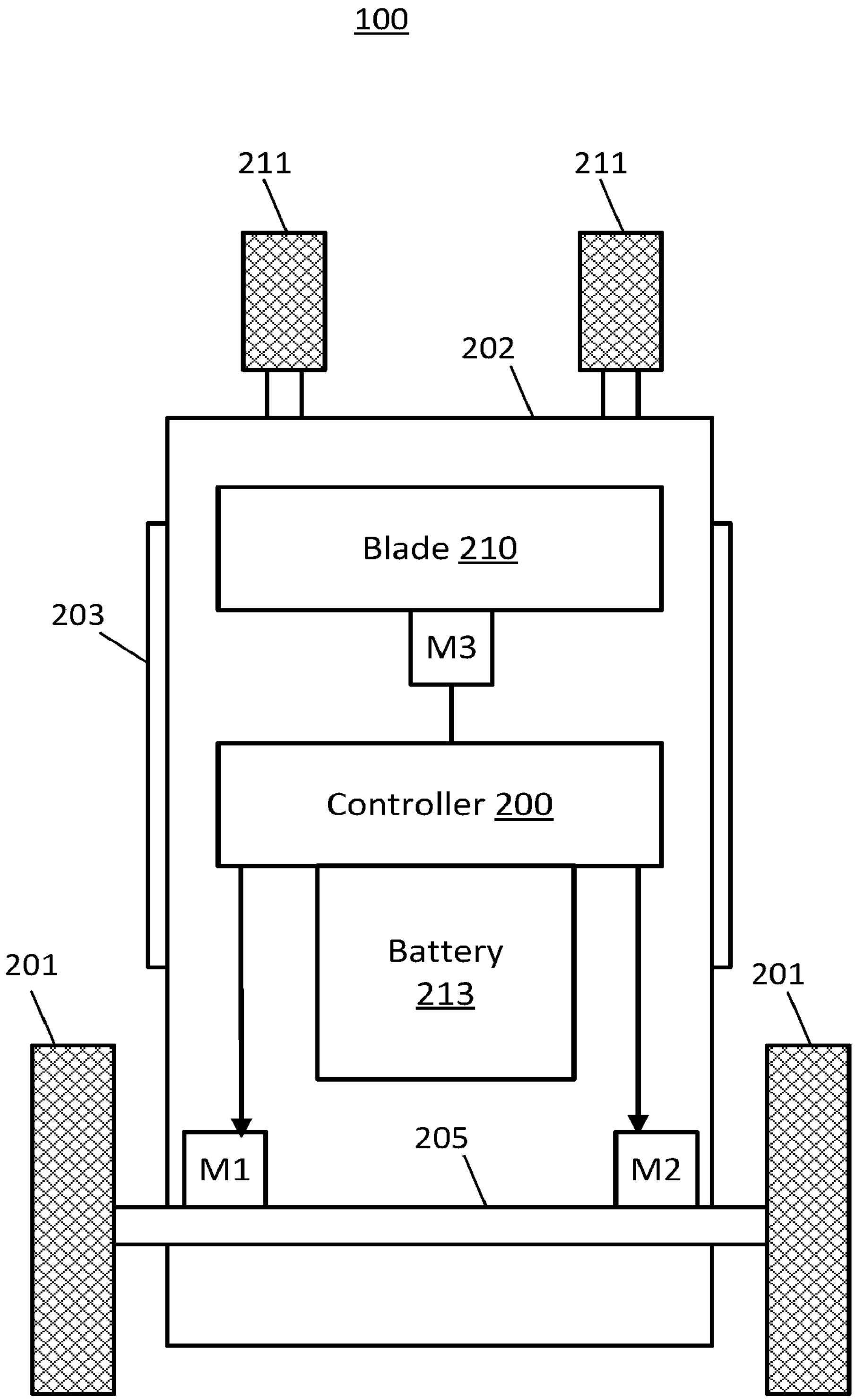
FIG. 2 illustrates an example lawnmower.

FIG. 2 illustrates an example vehicle 100 including wheels 201, a chassis or frame 202, and a seat 203 or other structure. A motor controller 200 is in communication with and controls drive motors M1 and M2 and also blade motor M3. The drive motors M1 and M2 may be connected to rear wheels 201 via shaft 205, and the front wheels 211 may be mounted on castors to freely move in any direction. The rear wheels 201 may be independently controlled by the controller 200 to steer the vehicle 100. Additional, different, or fewer components may be included.

Figure 3:
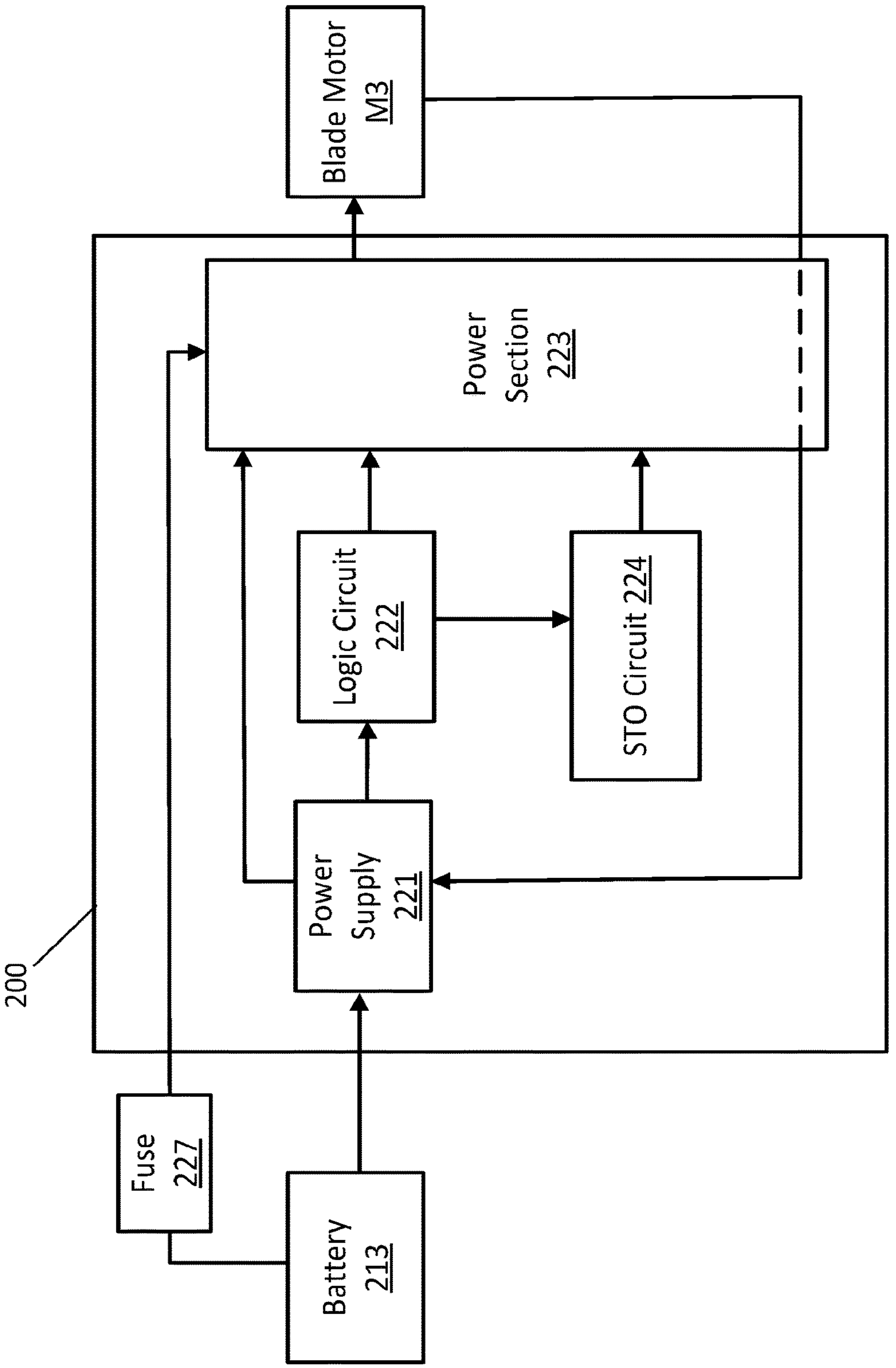
FIG. 3 illustrates an example motor controller.

FIG. 3 illustrates an example motor controller 200. The controller 200 may be connected to the battery 213 via a fuse 227. The fuse 227 is configured to break the connection or otherwise create an open circuit or isolation between the controller 200 and the battery 213 in the event a predetermined current (overcurrent) flows from the battery 213 to the controller 200. The controller 200 may include a power supply 221, a logic circuit 222, a safe torque off (STO) circuit 224, which may be referred to as an auxiliary logic circuit for motor control, and a power section 223. The controller 200 provides commands, or control signals, to the blade motor M3, which turns the blade of the lawnmower. The STO circuit 224, which is described in more detail below, includes at least a backup power source and a feedback from another circuit or the blade motor M3. The controller 200 includes may include a variety of other circuits or devices including an indicator such as a light, speaker, or display to provide information to the user. The indicator may indicate when the STO circuit 224 has been activated. The controller 200 may include an input for the user to activate (e.g., place on standby) the STO circuit 224 or disable the STO circuit 224. Additional, different, or fewer components may be included.

The power supply 221 may be configured to convert the electrical signal received from the battery 213 to one or more converted signals as used by the logic circuit 222 and the power section 223. The electrical signal from the battery 213 as well as the converted signals may be DC. Thus, the power supply 221 may be a DC to DC converter with one input and multiple output levels.

The battery 213 may provide a high voltage level to the power supply 221. The power supply 221 may convert the high voltage level to a first low voltage level for the logic circuit 222 and a second low voltage level for the power section 223. The high voltage level from the battery 213 may vary as a function of load and/or charge. The power supply 221 regulates or minimizes these variations in the converted electrical signals. Examples for the high voltage level include 24, 48, or 96 volts. Examples for the first low voltage level include 3.3 or 5 volts. Examples for the second low voltage level include 5, 8, or 10 volts. In addition or in the alternative, the battery 213 may be configured to provide power to power section 223 or motor circuit.

The power section 223 is configured to provide a drive signal to the blade motor M3. The power section 223 may also provide drive signal to the wheel motors M1 and M2. The power section 223 may include a bridge or other rectification circuit. The rectification circuit may be a DC to AC converter that converts the DC signal to a sinusoidal drive signal. In the case of an AC motor for blade motor M3, the motor M3 may included three phases (or four phases) and the power section 223 may include a corresponding rectification circuit for each phase.

The power section 223 receives the second low voltage level converted signal from the power supply 221 and turn on or off the blade motor output signal. The power section 223 drives high power elements or semiconductors including field effect transistors (FETs), metal-oxide semiconductor field effect transistors (MOSFETs), bipolar junction transistor (BJTs), insulated-gate bipolar transistors (IGBTs), silicon carbide (SiC) or another semiconductor switch. Any of these example semiconductor switches may include a conditioning and control circuit that receives the second low voltage level converted signal from the power supply 221 and activates and deactivates the semiconductor switch in response to the second low voltage level converted signal.

Figure 4:
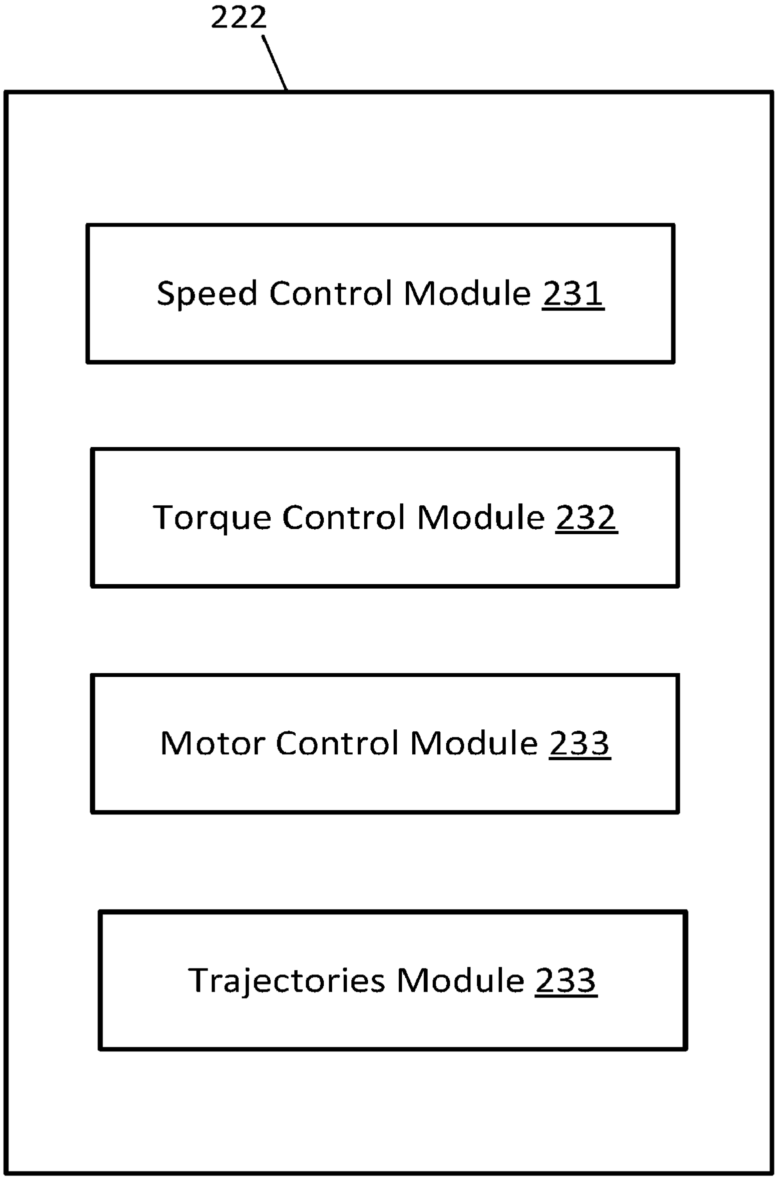
FIG. 4 illustrates an example logic circuit for the motor controller

FIG. 4 illustrates an example logic circuit 222 for the motor controller 200. The logic circuit 222 may include a speed control module 231, a torque control module 232, a motor control module 233, and a trajectories module 233. Additional, different, or fewer components may be included.

The speed control module 231 may generate a control signal for the power section 223 based on a target speed. The target speed may be a set value. The target speed may be received from an input device from the user. The target speed may be set by a throttle input. The target speed may be set by a speed setting. The target speed may be calculated by the motor controller 200 based on one or more parameters or sensed conditions. The logic circuit 222 may include a comparator configured to compare the target speed to a sensed speed. When the target speed is less than the sensed speed, the logic circuit 222 outputs a command to the power section 223 to increase power to the blade motor M3. When the target speed exceeds the sensed speed, the logic circuit 222 outputs a command to the power section to decrease power to the blade motor M3.

The torque control module 232 may generate a control signal for the power section 223 based on a target torque. The target torque may be a set value. The target torque may be received from an input device from the user. The target torque may be set by a throttle input. The target torque may be set by a torque setting. The target torque may be calculated by the motor controller 200 based on one or more parameters or sensed conditions. The target torque may be based on the thickness of turf or grass in contact with the blade. The torque setting may be inversely proportional to the speed sensor.

The logic circuit 222 may include a comparator configured to compare the target torque to a sensed torque. When the target torque is less than the sensed torque, the logic circuit 222 outputs a command to the power section 223 to increase power to the blade motor M3. When the target torque exceeds the sensed torque, the logic circuit 222 outputs a command to the power section to decrease power to the blade motor M3.

The motor control module 233 may send other commands to the blade motor M3 via the power section. The motor control module 233 may analyze sensor data. For example, a tilt sensor may detect whether the electric vehicle is at a predetermined angle, and the motor control module 233 may generate and send a command to the power section 223 to stop the blade motor M3 or otherwise slow the blade motor M3 in response to the output of the tilt sensor. In another example, a height sensor may detect the height of the blade, and the motor control module 233 may generate and send a command to the power section 223 to stop the blade motor M3 or otherwise slow the blade motor M3 in response to the output of the height sensor.

The trajectories module 233 may determine velocity profiles, trajectories, or a series of speed or torque settings over time. The trajectories module 233 may send the series of speed or torque settings, which may be paired with time values or time intervals, to the speed control module 231, the torque control module 232, or the motor control module 233, to control the blade motor M3 via the power section 223.

Figure 5:
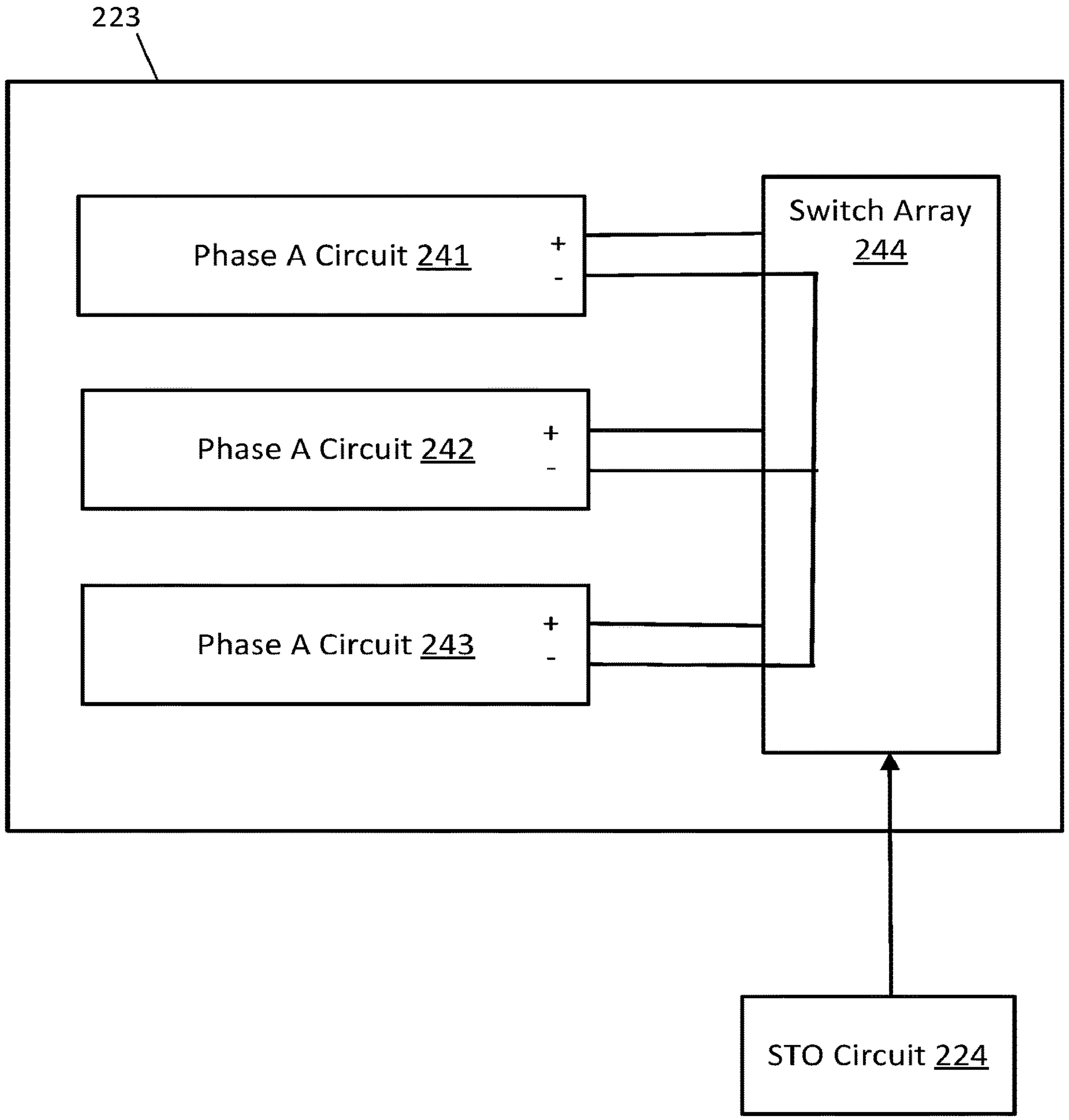
FIG. 5 illustrates an example power section for the motor controller.

FIG. 5 illustrates an example power section 223 for the motor controller 200. The power section 223 may include a phase A circuit 241, a phase B circuit 242, and a phase C circuit 243, which are connected selectively by a switch array 244. The switch array 244 may include at least two switches. A first switch may connect the phase A circuit 241 to the phase B circuit 242. A second switch may connect the phase B circuit 242 to the phase C circuit 243. In another example, other pairs of the phases of the power section 223 may be connected by the switch array 244. The switch array 244 may connect the negative terminals or portions of the power section 223, and the positive terminals or portions of the power section 223 may remain connected to the blade motor M3.

The switch array 244 may receive an input command or an input signal from the STO circuit 224. In response to the input command or the input signal, the switch array 244 causes two or more phases of the power section 223 to be shorted together, which allows the reverse current flowing out of the motor, as discussed in more details below. Additional, different, or fewer components may be included.

Figure 6:
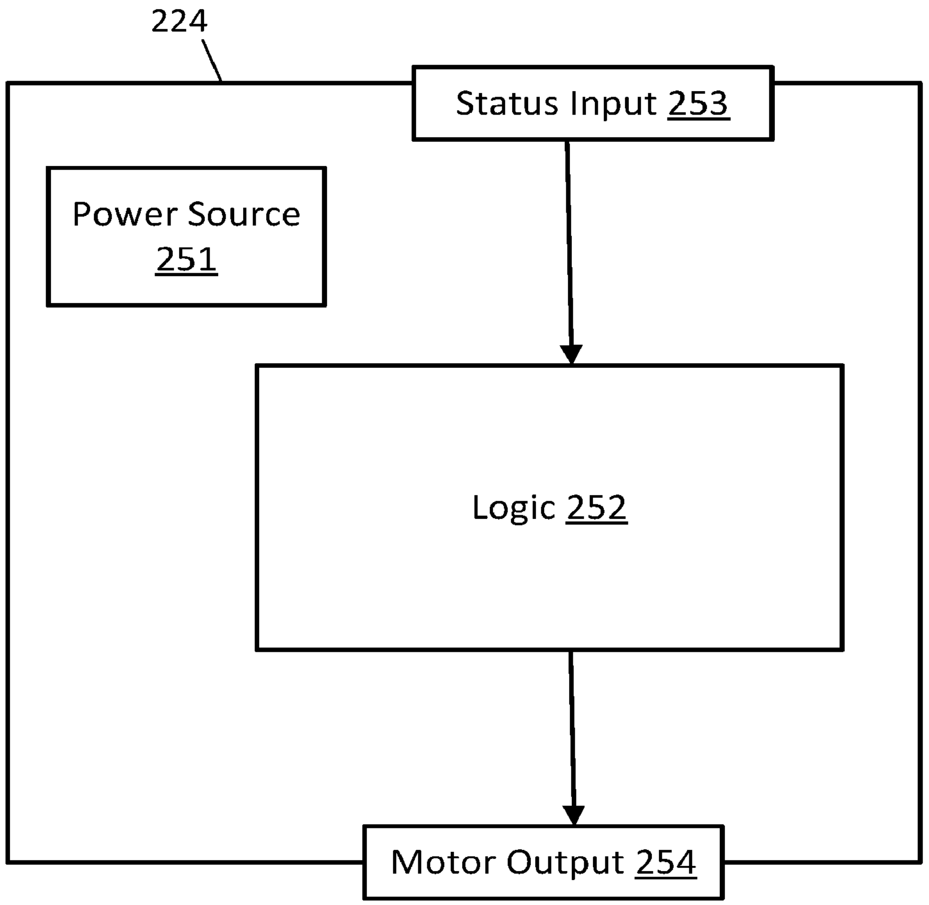
FIG. 6 illustrates an example safety circuit for the motor controller.

FIG. 6 illustrates an example STO circuit 224 for the motor controller 200. The STO circuit 224 may include a power source 251 and a logic 252. The logic 252 is in communication with a status input device 253. The logic 252 is in communication with a motor output 254. The power source 251 and the battery 213 are independent in that failure of the battery 213 does not affect the operation of the power source 251. Additional, different, or fewer components may be included.

The power source 251 is a backup power source configured to provide stored power to the STO circuit 224 in the event of a failure of the battery 213. The power source 251 may include a battery (e.g., a coin battery, watch battery) and may include alkaline (manganese dioxide), lithium, or silver oxide. The power source 251 may include a capacitor. The capacitor may be protected by a diode or another type of reverse energy flow blocking devise. The capacitor (power source 251) may be charged (e.g., continuously charged) by the battery 213 during normal operation of the controller 200 or normal operation of the vehicle. The capacitor (power source 251) may be charged by the back electromotive force (EMF) from the blade motor M3 and the power section 223 when the bladed motor M3 acts as a generator. That is, when the battery is disconnected, and the blade motor M3 generates an EMF voltage through the power section 223 to the power supply 221, the EMF voltage may charge the backup power source 251 of the STO circuit 224. When the battery 213 experiences a failure event, the power source 251 provides power to the STO circuit 224. Other backup power sources may be used.

The failure of the battery 213 may correspond to disconnection of the battery 213, for example, when one or more cables, connectors, terminals, cells, solder joints, or other components are broken or otherwise break an electrical connection with the battery 213. The failure of the battery 213 may be detected based on the operation of a component of the controller 200.

A status input 253 provides a feedback or status signal from the controller 200 to the STO circuit 224. The status input 253 may be a communication interface, a connector, a port, a pin, or another device that facilitates the feedback or status signal as an input to the STO circuit 224. The status signal indicates whether the controller 200 is in normal operation (i.e., whether a failure event or disconnection has occurred). There are several indicators of normal operation. The status input 253 may provide a power level (e.g., power pin) from a component in the logic circuit 222. When the components of the logic circuit 222 (TTL device, AND gate, integrated circuit) have a predetermined voltage level on a power pin tied to the status input 253, the STO circuit 224 remains in standby. When the components of the logic circuit 222 do not have the predetermined voltage on the power pin tied to the status input 253, the STO circuit 224 is activated and causes the switch array 244 to connect two or more phases of the power section 223.

Other connections for the status input 253 are possible. The status input 253 may be connected to the power section 223. In this case, the feedback or status signal indicates whether one or more components (e.g., a transistor) in the power section 223 are operating normally. The status input 253 may be connected to the power supply 221. In this case, the feedback or status signal indicates whether the power supply 221 is receiving power from the battery 213. The status input 253 may be connected to a connector on the batter side that indicates whether or not the battery 213 has become disconnected.

Logic 252 receives the feedback or status signal and determines an output signal. In one simple example, the logic 252 is an inverter. When the status signal is high, the logic 252 generates a low output signal, and the power section 223 operates normally. When the status signal is low, the logic 252 generates a high output signal, and the power section 223 causes the power section 223 to short together two or more phases of the power section 223.

The logic 252 may also include a combination of logic gates (OR gates, AND gates or others). The logic 252 may receive other inputs such as a feedback signal from a tilt sensor. When the tilt sensor indicates a tilt has occurred and the feedback signal from the controller 200 indicates the battery has been disconnected, the high output signal is sent to the power section 223. The logic 252 may receive a safety signal from a safety sensor. The safety sensor may be an indication that the user is standing up or otherwise is removed from a seat, a bail lever is actuated/released, or another mechanism. When the tilt sensor indicates a safety event has occurred and the feedback signal from the controller 200 indicates the battery has been disconnected, the high output signal is sent to the power section 223. Similar logic combinations may be based on user commands, throttle settings, temperature settings, or other devices.

The motor output 254 provides the output signal from the STO circuit 224 to the power section 223. The motor output 254 may be a communication interface, a connector, a port, a pin, or another device that facilitates the transmission of the output signal to the power section 223. The output signal may be a binary signal (low or high) or and ON/OFF signal. When the output signal goes high or ON, the power section 223 is configured to connect two or more phases of the power section 223 and the blade motor M3.

Figure 7:
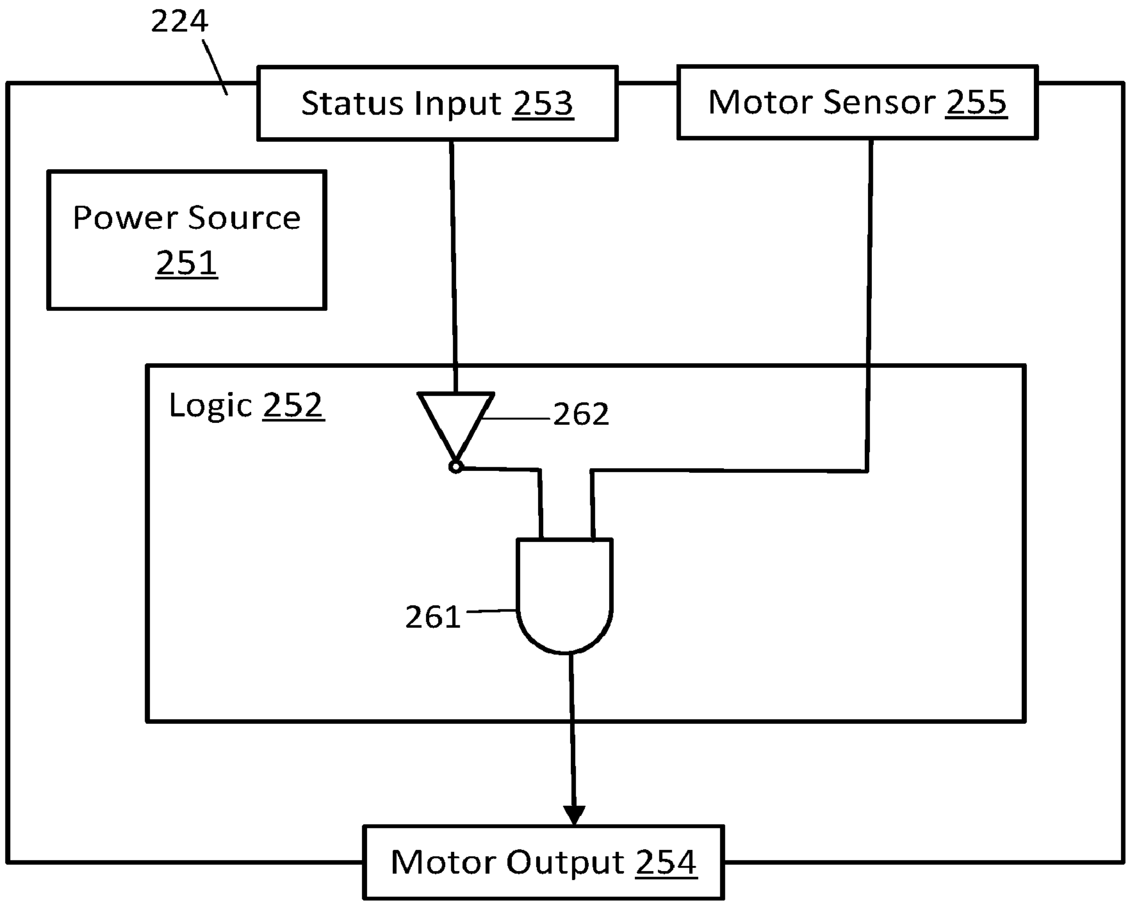
FIG. 7 illustrates another example safety circuit for the motor controller.

FIG. 7 illustrates another example STO circuit 225 for the motor controller 200. The STO circuit 224 may include a power source 251 and a logic 252. The logic 252 is in communication with a status input device 253 and sensor input device 255. The logic 252 is in communication with a motor output 254. Additional, different, or fewer components may be included.

The example of FIG. 7 includes separate status input device 253 and motor sensor input device 255 as dual inputs to the STO circuit 224. The STO circuit 224 is powered from kinetic energy from before the battery disconnect that was transferred to the power source 251. The power source 251 may include only enough stored energy to operate the STO circuit 224 for only the short time required to short the motor and bring it to a near stop.

The motor sensor input device 255 may be a communication interface, a connector, a port, a pin, or another device that facilitates sensor data for the blade motor M3 as an input to the STO circuit 224.

The sensor input device 255 may be coupled to a variety of types of sensors configured to measure the operation of the blade motor M3. The sensor data or status signal from the sensor input device 255 indicates whether the at least one motor is rotating. The status signal may include a series of pulses generated by the sensor.

The sensors may be motion sensors that detect the movement or rotation the blade motor M3 or a component thereof. The motion may be mounted on, or in viewing position of, the shaft of the motor, a rotating component of the motor, the rotor of the motor, the blade, or another location. The sensor may detect movement of the rotor of the motor or a shaft of the motor. The motion sensor may be an optical sensor that detects a mark or indicia. For example, the shaft of the motor may include a mark detectable by the optical sensor on each revolution of the shaft. The sensors may include at least one magnetic sensor configured to detect windings of the motor or a magnet.

The sensors may be electrical sensors. The electrical sensors may measure the field windings of the blade motor M3. The electrical sensor may measure the back electromotive force (EMF). The detection could be considered sensorless when electrical detection is used. A detection circuit may detect the reluctance ripple in the input of the motor caused by the coil of the motor passing metal at a certain point in the rotation of the motor. The controller 200 may be configured to calculate speed of the motor as function of reluctance.

The STO circuit 224 may receive the status signal from the status input device 253 and the speed signal from the motor sensor input device 255. The logic 252 may analyze the status signal and the speed signal to determine whether a battery disconnect even has occurred while the blade motor M3 is still spinning. In one example, the logic 252 includes an AND gate 261 and a NOT gate 262 that determine whether the status signal is low or OFF (indicating that one or more components of the controller 200 are inactive) and the speed signal is high or ON (indicating that the blade motor M3 is still spinning). In this condition, the output of the AND gate 261 of the logic 252 is high or ON and sent to the power section 223.

The output of the AND gate 261 of the logic 252 causes the power section 223 to switch one or more power circuits by activating one or more semiconductor device to turn short or couple two or more of the power circuits together. Kinetic energy from before the battery disconnect is transferred to heat after the battery disconnect because the power sections are electrically connected. In other words, electrical energy from before the battery disconnect is transferred from a first winding of the motor to a second winding of the motor.

Figure 8:
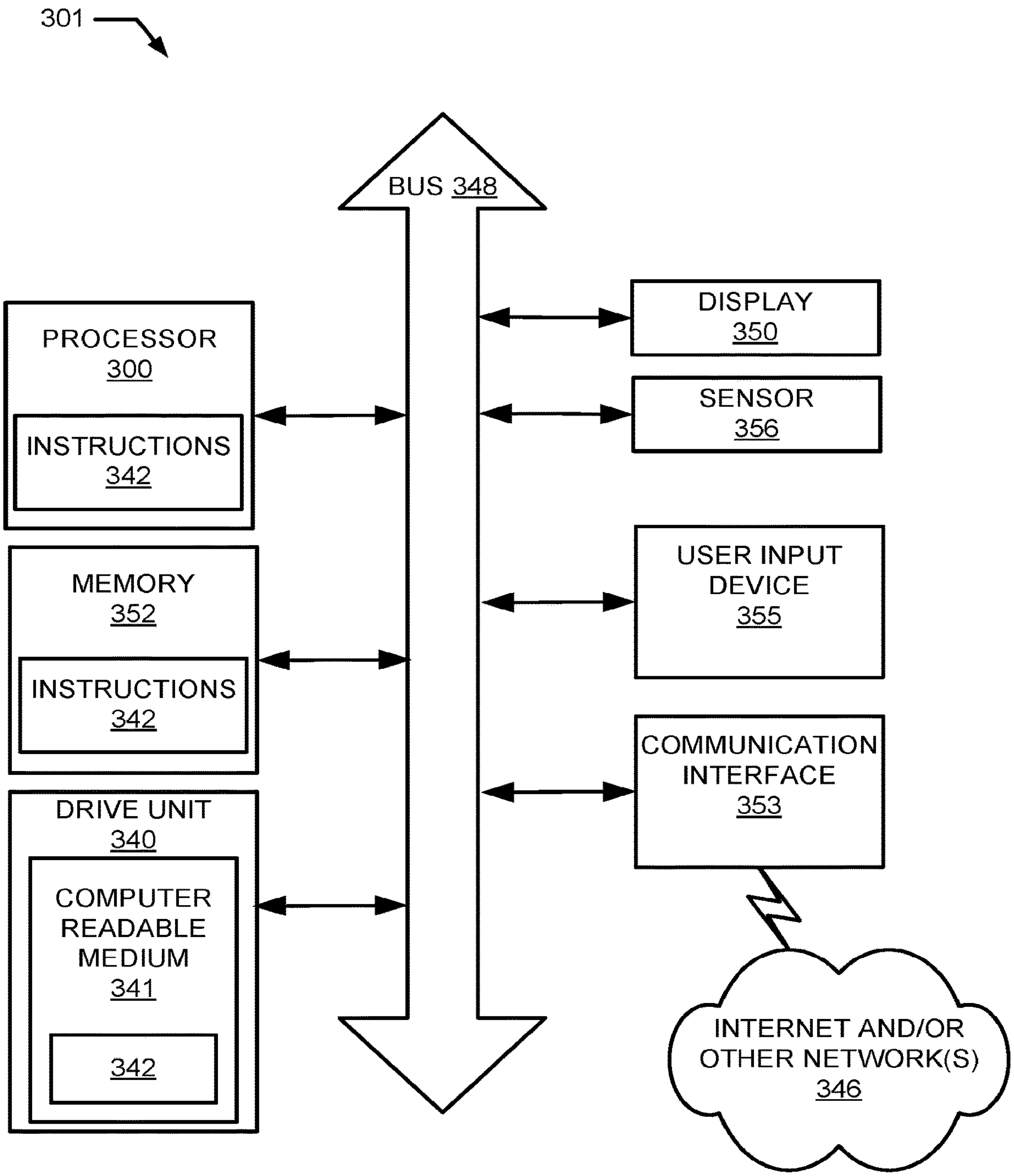
FIG. 8 illustrates an example microprocessor implementation of the example safety circuit.

FIG. 8 illustrates an example microprocessor implementation of the example safety circuit. In some examples the controller 301 including processor 300 implements the STO circuit 224. In other example, the controller 301 including processor 300 implements the motor controller 200 including the STO circuit 224. The controller 301 may include a processor 300, a memory 352, and a communication interface 353 for interfacing with devices or to the internet and/or other networks 346. In addition to the communication interface 353, a sensor interface may be configured to receive data from the sensors described herein or data from any source for the position of the motorized vehicle 100, motor M1 or M2, or a wheel 201. The components of the control system may communicate using bus 348. The control system may be connected to a workstation or another external device (e.g., control panel) and/or a database for receiving user inputs, system characteristics, and any of the values described herein.

Optionally, the control system may include an input device 355 and/or a sensing circuit 356 in communication with any of the sensors. The sensing circuit receives sensor measurements from sensors as described above. The input device may include any of the user inputs such as buttons, touchscreen, a keyboard, a microphone for voice inputs, a camera for gesture inputs, and/or another mechanism.

Optionally, the control system may include a drive unit 340 for receiving and reading non-transitory computer media 341 having instructions 342. Additional, different, or fewer components may be included. The processor 300 is configured to perform instructions 342 stored in memory 352 for executing the algorithms described herein. A display 350 may be an indicator or other screen output device. The display 350 may be combined with the user input device 355.

Figure 9:
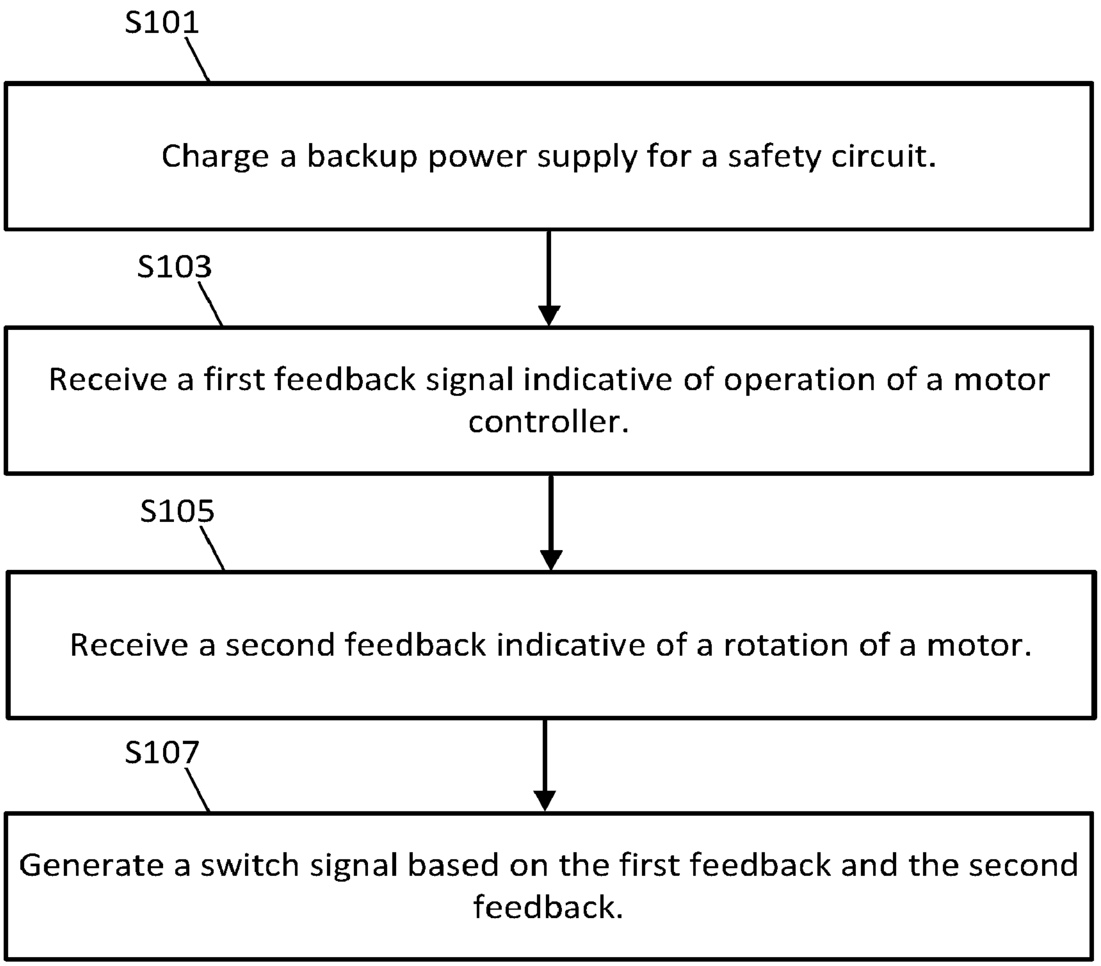
FIG. 9 illustrates a flow chart for the apparatus of FIG. 8.

FIG. 9 illustrates a flow chart for the apparatus of FIG. 8. The acts of the flow chart may be performed by the controller 301 (e.g., the motor controller 200 or the STO circuit 224). Additional, different of fewer acts may be included.

At act S101, backup power supply is charged in a motor controller. The backup power supply may be charged by a main power supply (e.g., battery). The backup power supply may be another battery or a power storage circuit. The power storage circuit may include at least one capacitor and at least one diode to protect the at least one capacitor.

A safety circuit is powered by the backup power supply. The capacitor may discharge to provide power to the safety circuit for the operations of act S103, S105, and S107.

At act S103, the controller 301 (e.g., through processor 300) receives, at the safety circuit, a first feedback signal indicative of operation of a motor controller. The first feedback signal indicates whether the motor controller is operating normally. In some examples, the first feedback signal may be electrically coupled to a power rail of the motor controller circuit. In some examples, the first feedback signal may be electrically coupled to a particular pin of a component of the motor controller.

At act S105, the controller 301 (e.g., through processor 300) receives, at the safety circuit, a second feedback signal indicative of a rotation of a motor. The second feedback signal may be based on a sensor output at the motor. The second feedback signal may include pulses that represent rotations of the motor.

At act S107, the controller 301 (e.g., through processor 300) generates, at the safety circuit, a switch signal in response to the first feedback signal and the second feedback signal. At least two phases of the driving circuit for the motor are connected in response to the switch signal.

Processor 300 may be a general purpose or specific purpose processor, an application specific integrated circuit (ASIC), one or more programmable logic controllers (PLCs), one or more field programmable gate arrays (FPGAs), a group of processing components, or other suitable processing components. Processor 300 is configured to execute computer code or instructions stored in memory 352 or received from other computer readable media (e.g., embedded flash memory, local hard disk storage, local ROM, network storage, a remote server, etc.). The processor 300 may be a single device or combinations of devices, such as associated with a network, distributed processing, or cloud computing.

Memory 352 may include one or more devices (e.g., memory units, memory devices, storage devices, etc.) for storing data and/or computer code for completing and/or facilitating the various processes described in the present disclosure. Memory 352 may include random access memory (RAM), read-only memory (ROM), hard drive storage, temporary storage, non-volatile memory, flash memory, optical memory, or any other suitable memory for storing software objects and/or computer instructions. Memory 352 may include database components, object code components, script components, or any other type of information structure for supporting the various activities and information structures described in the present disclosure. Memory 352 may be communicably connected to processor 300 via a processing circuit and may include computer code for executing (e.g., by processor 300) one or more processes described herein. For example, memory 298 may include graphics, web pages, HTML files, XML files, script code, shower configuration files, or other resources for use in generating graphical user interfaces for display and/or for use in interpreting user interface inputs to make command, control, or communication decisions.

In addition to ingress ports and egress ports, the communication interface 353 may include any operable connection. An operable connection may be one in which signals, physical communications, and/or logical communications may be sent and/or received. An operable connection may include a physical interface, an electrical interface, and/or a data interface. The communication interface 353 may be connected to a network. The network may include wired networks (e.g., Ethernet), wireless networks, or combinations thereof. The wireless network may be a cellular telephone network, an 802.11, 802.16, 802.20, or WiMax network, a Bluetooth pairing of devices, or a Bluetooth mesh network. Further, the network may be a public network, such as the Internet, a private network, such as an intranet, or combinations thereof, and may utilize a variety of networking protocols now available or later developed including, but not limited to TCP/IP based networking protocols.

While the computer-readable medium (e.g., memory 352) is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored. The computer-readable medium may be non-transitory, which includes all tangible computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

What is claimed is:

1. A system for motor stoppage during a battery disconnect, the system comprising:

a safe torque off circuit;

a backup power source configured to supply power to the safe torque off circuit or to a logic circuit of the safe torque off circuit; and a motor coupled to a blade driven by a motor circuit;

wherein the safe torque off circuit is configured to receive a status signal indicating whether the motor is rotating;

wherein, in response to the status signal, the safe torque off circuit is configured to provide a switch signal to the motor circuit, wherein the switch signal causes the motor and the blade to slow in response to the battery disconnect.

2. The system of claim 1 wherein the backup power source and the battery are independent.

3. The system of claim 1 wherein the motor circuit includes a plurality of phase sections.

4. The system of claim 3 wherein the switch signal electrically connects the plurality of phase sections.

5. The system of claim 4 wherein kinetic energy from before the battery disconnect is transferred to the backup power source after the battery disconnect.

6. The system of claim 4 wherein kinetic energy from before the battery disconnect is transferred to heat after the battery disconnect because the plurality of phase sections are electrically connected.

7. The system of claim 4 wherein electrical energy from before the battery disconnect is transferred from a first winding of the plurality of phase sections to a second winding of the plurality of phase sections.

8. The system of claim 4 wherein the switch signal activates a semiconductor device to turn on the plurality of phase sections.

9. The system of claim 1 wherein the status signal indicates whether the motor circuit is in normal operation.

10. The system of claim 1 wherein the backup power source includes a capacitor.

11. A motor controller for a lawnmower, the motor controller including:

a safe torque off circuit for motor stoppage during a battery disconnect;

a backup power source configured to supply power to the safe torque off circuit or to a logic circuit of the safe torque off circuit; and wherein the safe torque off circuit receives a feedback, the feedback including an indication of whether at least one blade of the lawnmower is rotating and an indication of normal operation of the motor controller;

wherein the safe torque off circuit is configured to provide a switch signal to a motor circuit in response to the feedback.

12. The motor controller of claim 11 wherein the indication of normal operation of the motor controller is provided by a status signal from one or more components of the motor controller.

13. The motor controller of claim 11 wherein the indication of whether at least one blade of the lawnmower is rotating includes a pulse from a sensor.

14. The motor controller of claim 11 wherein the backup power source includes a capacitor and a diode.

15. The motor controller of claim 14 wherein the capacitor is charged before the battery disconnect.

16. A method for controlling a motor, the method comprising:

receiving, at a safety circuit, a first feedback signal indicative of operation of a motor controller;

receiving, at the safety circuit, a second feedback indicative of a rotation of a motor; and generating, at the safety circuit, a switch signal in response to the first feedback and the second feedback, wherein at least two phases of a driving circuit for the motor are connected in response to the switch signal.

17. The method of claim 16 further comprising:

charging a backup power supply; and discharging the backup power supply to operate the safety circuit.

18. The method of claim 16 wherein the second feedback indicates whether a lawnmower blade is spinning.

* * * * *